United States Patent [19]
Hara et al.

[11] Patent Number: 5,526,085
[45] Date of Patent: Jun. 11, 1996

[54] ELECTRICAL STRUCTURE FOR A CAMERA

[75] Inventors: Masaharu Hara; Fumiya Taguchi; Nobuaki Sasagaki, all of Kanagawa-ken; Suminori Watanabe, Saitama-ken, all of Japan

[73] Assignee: Nikon Corporation, Tokyo, Japan

[21] Appl. No.: 377,215

[22] Filed: Jan. 24, 1995

[30]    Foreign Application Priority Data

Feb. 10, 1994  [JP]  Japan .................................. 6-036316
Feb. 14, 1994  [JP]  Japan .................................. 6-037519

[51] Int. Cl.$^6$ .................................................. G03B 17/02
[52] U.S. Cl. ........................................... 354/288; 354/485
[58] Field of Search ................................. 354/288, 485, 354/275

[56]                References Cited

U.S. PATENT DOCUMENTS 4,317,628  3/1982  Shimizu .................................. 354/288
4,853,734  8/1989  Tokura et al. ........................... 354/485

*Primary Examiner*—A. A. Mathews

*Attorney, Agent, or Firm*—Oliff & Berridge

[57]                ABSTRACT

The invention is directed to an electrical connecter, mounted on a mounting board within a camera, to which an FPC board is connected, that does not increase the size of the camera, and is a simplified shape and structure. The main camera body is equipped with a flat portion on one portion of the outer wall that forms a film chamber comprising either a cartridge chamber or a spool chamber. A mounting board has a section that faces and is substantially parallel to the flat portion and an extension section that does not face the flat portion. A horizontal or vertical electrical connector is attached to the extension section of the mounting board on the surface generally facing the outer wall of the film chamber and an electrical board comprising an FPC board or the like is connected to the electrical connecter. To enhance the features of the camera, a first electrical component is loaded on the surface of the mounting board opposite to the electrical connector loaded surface. The FPC board runs along the connector loaded surface. The FPC board passes around an edge section of the mounting board to extend along the surface of the mounting board opposite the connecter loaded surface. A second electrical component is loaded on the extended part of the FPC board.

24 Claims, 16 Drawing Sheets

ELECTRICAL STRUCTURE FOR A CAMERA

BACKGROUND OF THE INVENTION

The invention relates to a camera in which flexible printed circuit board(s) are integrated within the camera to provide electrical connections for electrical structure parts, especially a camera with an improved flexible printed circuit board electrical structure that minimizes space requirements.

With conventional cameras of this type, it has been attempted to arrange a mounting board comprising an electrical control circuit alongside built-in components with a flat surface inside the camera and to install an electrical connecter, which is a connecting means to the various electrical components inside the camera, for electrically connecting an electrical board, such as a flexible printed circuit board (referred to hereafter as FPC board), to the mounting. In this case, in order to make it possible to arrange the thicknesses of the mounting board and the electrical connecter, a wide exclusive mounting region is necessary.

FIG. 11 shows an example of a conventional camera of this type. It presents a cross section that shows one side of the camera partially enlarged. In this drawing, the camera main body 1 is equipped with a cartridge chamber 2, as the film chamber, into which a film cartridge F is loaded and an aperture component 3 through which the film runs out from and back to the cartridge chamber 2.

Shutter unit 4 is shown by an imaginary line in the middle of the drawing to the front of the aperture component 3. A shrouding component 5 is provided to the front of the shutter unit 4 and is a structural component that surrounds the photographic light path from the photo lens (not shown) to the film. The side of the shrouding component 5 closest to the cartridge chamber 2 consists of the flat outer wall 5a.

The front body 6 is attached to the front surface of the main body 1 through the joining component 1a so as to cover the shrouding component 5. A commonly known rear cover (not shown) is positioned on the back side of the main body 1.

A film rewinding fork 7 carries out film rewinding by connecting with the cartridge shaft of the film cartridge F loaded into the cartridge chamber 2.

A flat surface portion 2a forms part of the outer wall of the cartridge chamber 2. The flat surface portion 2a is positioned opposite the flat outer wall 5a of the shrouding component 5. A mounting board 10 equipped with a controlling circuit for controlling the driving of the various electrical components inside the camera is positioned between the outer wall 5a and the flat portion 2a closest to the outer wall 5a of the shrouding component 5.

A horizontal (or other) electrical connecter 11 is attached to the mounting surface 10a of the mounting board 10. An FPC board 12, which is the means by which the various electrical components within the camera are connected, is connected to the electrical connecter 11.

In the structure of the basic conventional camera described above, because of the combined thickness of the mounting plate 10 and the horizontal electrical connecter 11, it is necessary to ensure a sufficient gap, in which they are located, between the outer wall 5a of the shrouding component 5 and the flat surface portion 2a of the outer wall of the cartridge chamber 2.

Therefore, in a conventional camera of this type, it is necessary to position the flat surface portion 2a of the outer wall of the cartridge chamber 2 well to the left side of FIG. 11. Thus, a structural layout must be used in the camera in which the entire cartridge chamber 2 is displaced to the left of the camera main body. As a result, the camera as a whole may become larger.

In other words, in a camera of the conventional structure described above, because a fairly wide exclusive mounting region is required in order to make possible the installation of mounting board 10, the electrical connecter 11 mounted therein and the FPC board 12, connected to the electrical connecter 11, the camera as a whole becomes unavoidably larger.

When it is desired to provide enhanced features to the camera, additional electrical components must be provided. For such a camera, a two-sided mounting board is normally used. With such mounting boards, the added electrical components are located on one board surface while the electrical connector for use in electrical connection is placed on the opposite board surface to provide for component integration in the limited space.

However, as can be seen in FIG. 11, should electrical components be placed on the other side of the mounting board 10 from the electrical connector 11, the space between the flat outer wall 5a and the mounting board 10 must be increased with a commensurate increase in the distance between the flat outer wall 5a and the flat surface portion 2a of the outer wall of cartridge chamber 2. Such a structure again increases the size of the camera.

SUMMARY OF THE INVENTION

The invention has been conceived in light of these types of problems. The invention has the object of providing a camera which has a structure comprising a mounting board, an electrical connecter mounted and connected to the mounting board, and an FPC board or the like connected to the connecter, that is an improved assembly and structure in which the size of the mounting portions of the camera is minimized. When providing enhanced features, additional electrical components may be mounted to the mounting board but in such a manner as to minimize the space required.

In order to meet these requirements, the basic camera of the invention comprises a main body with a flat surface on one portion of the outer wall that forms the film chamber, which is a cartridge chamber or a spool chamber; a mounting board with a portion that is adjacent to the flat surface, faces the flat surface in the main body and is approximately parallel thereto as well as an extension section that does not face the flat surface; an electrical connecter which is on the side opposite the main body on the mounting board and which is attached to the cover; and an electrical board that is connected to the electrical connecter.

In the basic camera of the invention, either a side flat portion of the main body that borders on the photo lens side or a flat portion on the front surface of the main body is used as the flat portion that forms part of the outer wall of the film chamber and is arranged alongside the mounting board.

Further, in the basic camera of the invention, either a horizontal or vertical electrical connecter is used and a flexible print circuit board that carries out the electrical connection with the electrical components within the camera is used as the electrical board.

According to the invention, the installing position and structure of the electrical connecter positioned inside the basic camera and the assembly and structure of the mounting board onto which the connecter is mounted are carefully planned. The exclusive mounting region is constructed compactly, the mounting efficiency is improved, and an increase in the size of the camera can be minimized or prevented.

It is a further object of the invention to provide an enhanced feature camera capable of integrating an FPC board properly without making the size of the overall camera too large by realizing a placement and integration structure suited for high density mounting without restricting the thickness of the mounting board and electrical components to be loaded on the FPC board, which is connected to the electrical connector for use in electrical connections loaded on the mounting board.

In order to minimize the space requirements, the enhanced feature camera of the invention comprises a first camera structural member, such as a shrouding component, comprising a substantially flat outer wall; a second camera structural member, such as a film chamber outer wall, comprising a side wall section facing the first camera structural member; a two-sided mounting board comprising a first section in the vicinity of and facing the side wall section of the second camera structural member and a second section not facing the side wall section; a horizontal electrical connector loaded on the second section of the mounting board; a first electrical component loaded on the opposite surface from the loading surface of the horizontal electrical connector for use in electrical connections in the mounting board; and an FPC board connected to the horizontal electrical connector placed along the connector loading surface on the mounting board, wherein the FPC board extends to the surface opposite from the connector mounting surface around an edge section of the mounting board, and wherein a second electrical component, with a certain thickness, is loaded on the extended opposite surface. Further, a relatively thin electrical component is loaded on the outboard side of the FPC board running along the connector loading surface of the mounting board in the enhanced feature camera of the invention.

On the two-sided mounting board and the FPC board attached on the mounting board, which are provided in the space between the outer and side walls of the first and the second structural members, the mounting of electrical components on the mounting board and the FPC board is made possible without restricting thickness, thus improving mounting efficiency on the mounting board and the FPC board of the enhanced feature camera.

BRIEF DESCRIPTION OF THE DRAWINGS

The invention will be described in view of, but is not limited thereby, the attached drawings, in which.

DESCRIPTION OF THE PREFERRED EMBODIMENTS

Figure 1:
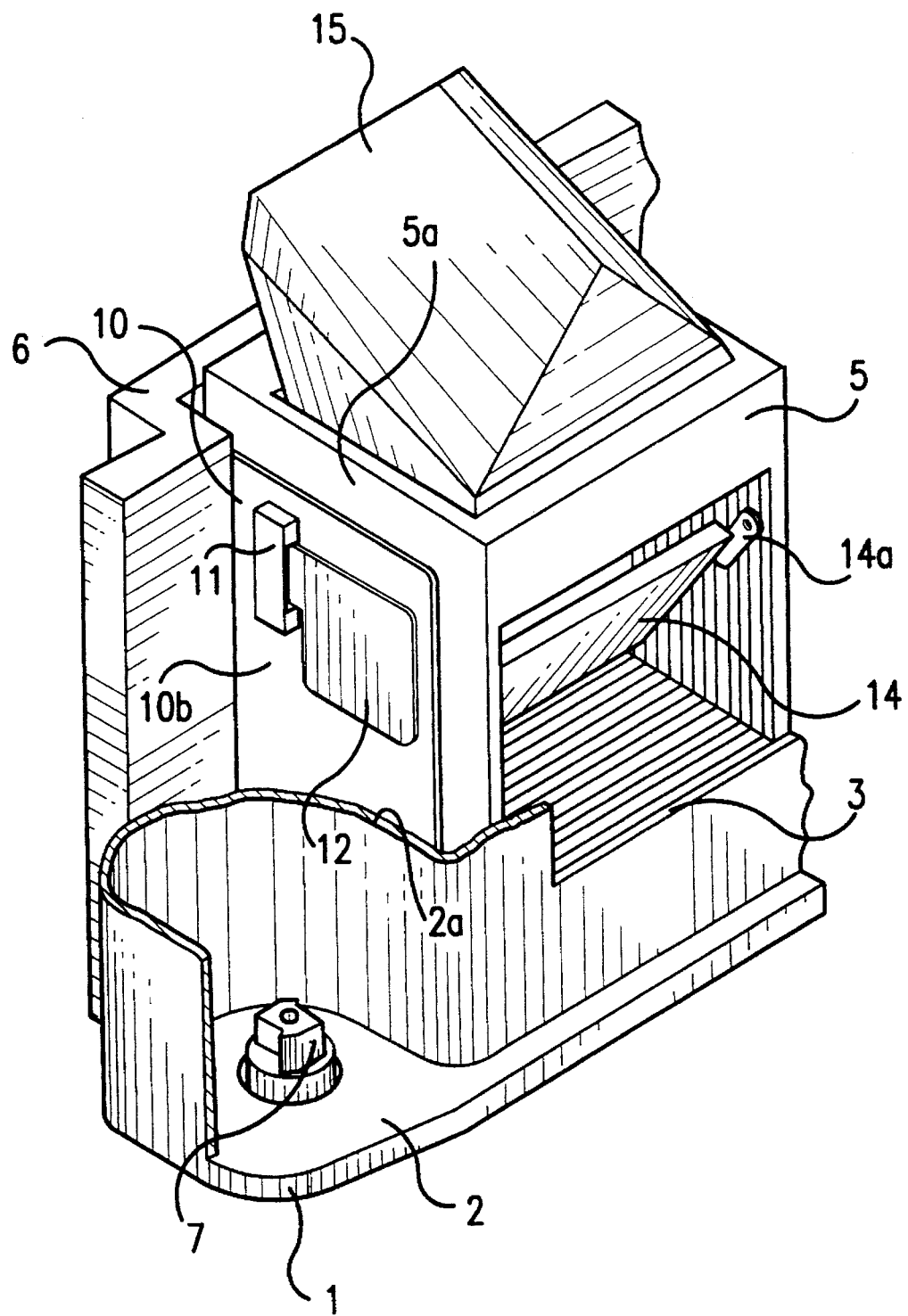
FIG. 1 is an oblique, partial view of a first embodiment of a basic camera of the invention showing a side portion that includes the structural components of part of the camera interior.
Figure 2:
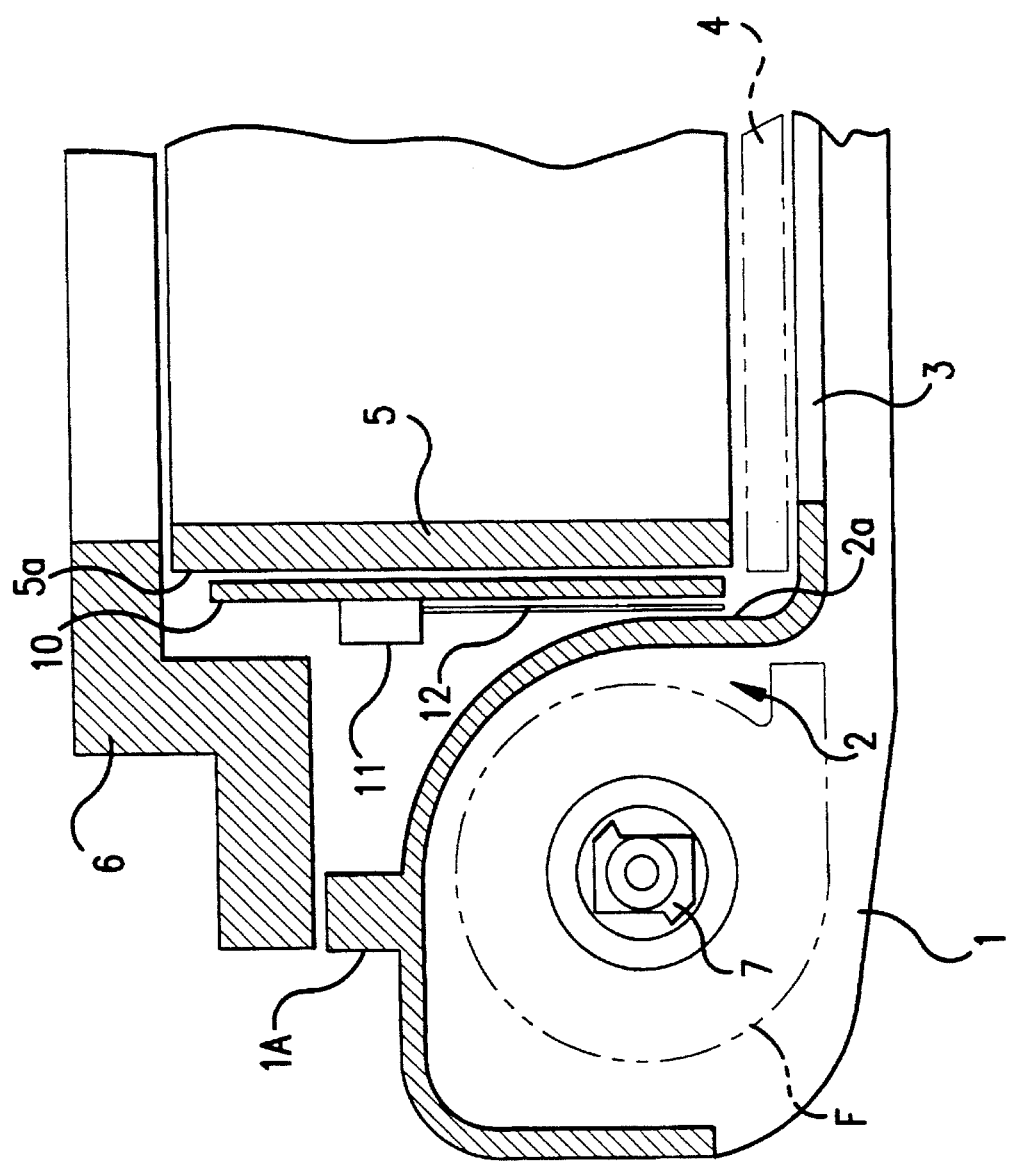
FIG. 2 is a partially enlarged cross section of only one side of the camera that shows the first embodiment of the basic camera of the invention.
Figure 11:
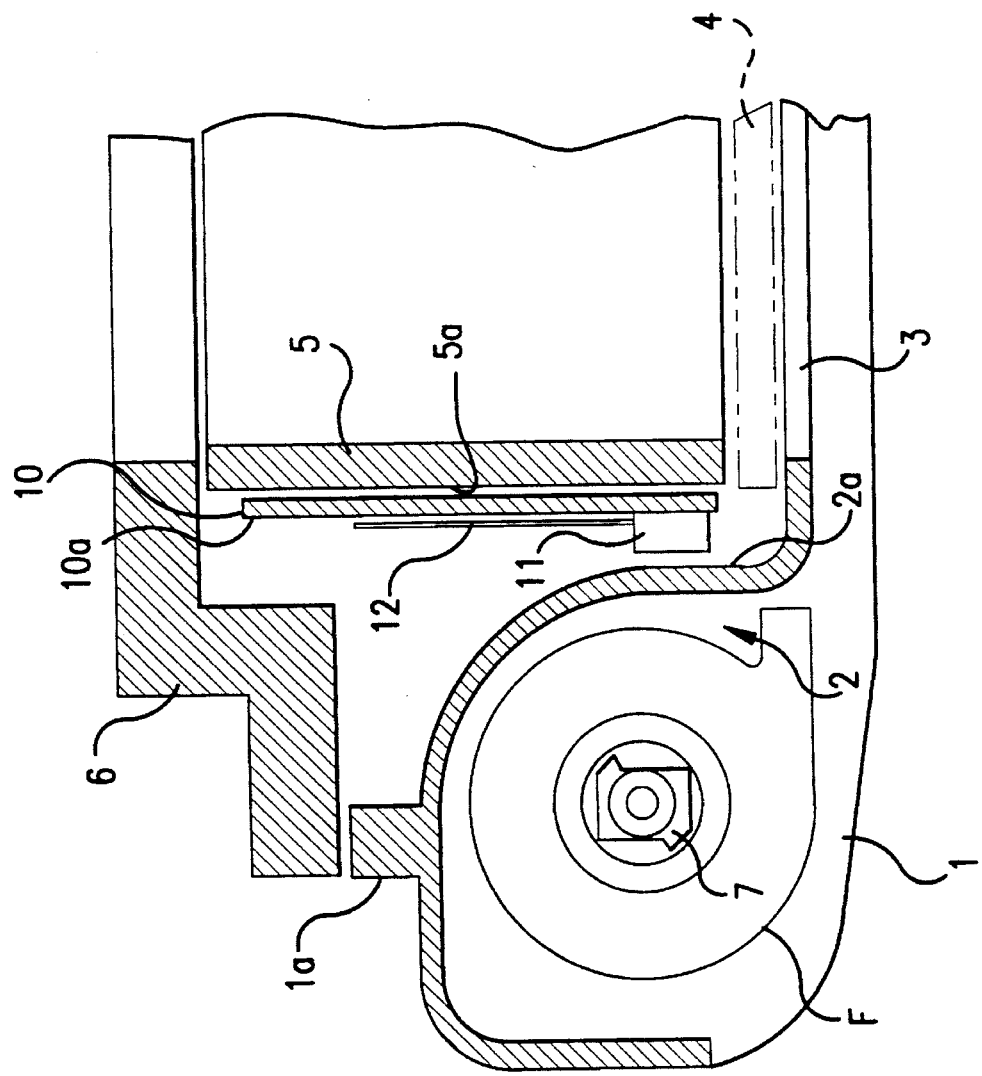
FIG. 11 is a partially enlarged cross section of the side of a conventional camera on which the cartridge chamber is positioned.

FIGS. 1 and 2 show a first embodiment of the basic camera of the invention. In these figures, components which are the same as or correspond to those found in FIG. 11 (described above) use the same reference symbols and detailed descriptions thereof are omitted.

In FIG. 1, a quick return mirror 14 is arranged on the inside of a shrouding component 5. As with commonly known mirrors of this type, the quick return mirror 14 conducts light to the finder optical system, retreats from the light path to the film at the time of photography, and then returns to the original position after photography.

A rotary shaft receiving component 14a for the quick return mirror 14 is connected to a rotatable shaft supported by the shrouding component 5 so as to be able to rotate freely. A pentagonal prism 15, a commonly known optical component, is attached to the top of the camera (As observed when the camera is held in a normal operating position. All future references to directions use the same frame of reference.).

According to the invention, the camera, in addition to the structure described above, comprises: a main body 1 with a flat surface 2a on one portion of the outer wall that forms the cartridge chamber 2 which, in FIG. 1, comprises the film chamber; a mounting board 10 with a section that is adjacent to, faces and is approximately parallel to the flat surface 2a of the cartridge chamber 2 and an extension section 10b that does not face the flat surface 2a; an electrical connecter 11 which is on the top end of the mounting board 10 and is attached to the extension section 10b; and an FPC board 12 as an electrical board that is connected to the electrical connecter 11.

In the first embodiment, the side flat portion 2a of the main body 1 that borders on the photo lens side (outer wall 5a of the shrouding component 5) is used as the flat portion that forms part of the outer wall of the film chamber 2 and is arranged alongside the mounting board 10. In addition, in this first embodiment, a parallel connector is used as the electrical connecter 11 and an FPC board 12, that carries out the electrical connection with the electrical components positioned within the camera, is used as the electrical board.

Through this structure, the installing position and structure of the electrical connecter 11 positioned inside the camera and the assembly and structure of the mounting board 10 onto which the electrical connecter 11 is mounted are carefully planned. The exclusive mounting region is constructed compactly, the mounting efficiency is improved, and an increase in the size of the camera can be prevented.

The extension section 10b of the mounting board 10 does not face the side flat component 2a on the outer wall of the cartridge chamber 2 and a horizontal electrical connecter 11 is connected and mounted to the extension section 10b. Horizontal is defined as substantially parallel to the mounting board 10. In other words, the mounting board 10 is adjacent and parallel to the flat surface 2a of the outer wall of the cartridge chamber 2 and is positioned in the thickness space between the flat outer wall 5a of the shrouding component 5 and the flat surface 2a. In addition, the electrical connecter 11 is connected and mounted to the extension section 10b, which extends to a position that does not face the flat surface 2a of the outer wall of the cartridge chamber 2.

An FPC board 12 is connected to the electrical connecter 11 as the means of connecting the wiring with the electrical components inside the camera. The FPC board 12 extends along the surface of the mounting board 10 facing the cartridge chamber 2, as shown in FIGS. 1 and 2.

In this type of structure, since the electrical connecter 11 is not on the mounting board 10 adjacent to the flat surface 2a of the outer wall of the cartridge chamber 2, but is connected and arranged on the extension section 10b, the mounting space between the flat surface 2a of the outer wall of the cartridge chamber 2 and the flat outer wall 5a of the shrouding component 5 can be held to a bare minimum while allowing the electrical connecter 11 to be mounted efficiently.

Figure 3:
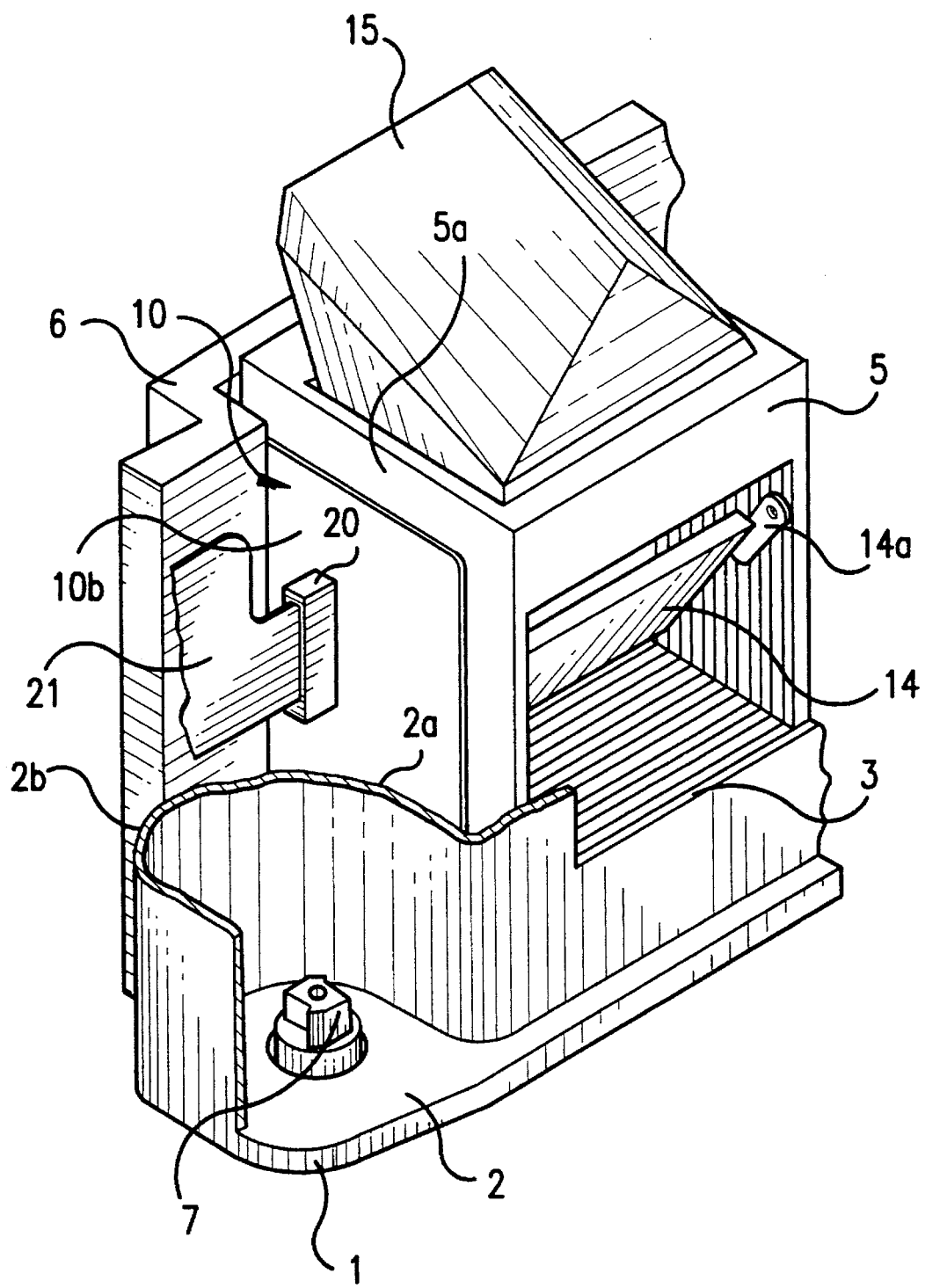
FIG. 3 is an oblique, partial view which shows a second embodiment of the basic camera of the invention showing a portion of one side that includes the structural components of part of the camera interior.
Figure 4:
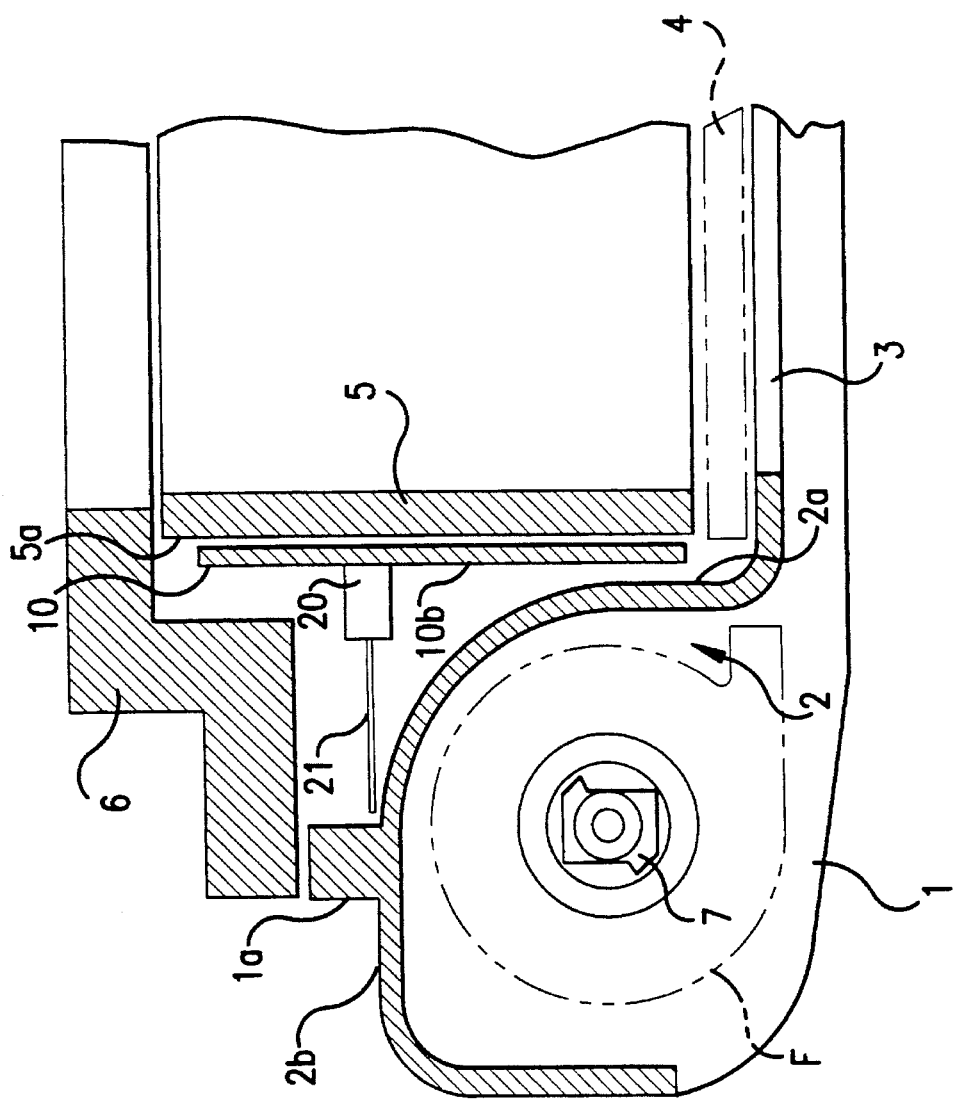
FIG. 4 is a partially enlarged cross section of only one side of the camera that shows the second embodiment of the basic camera of the invention.

FIGS. 3 and 4 show a second embodiment of the invention. In this embodiment, a vertical electrical connecter 20 is mounted to the extension section 10b of the mounting board 10. Vertical is defined as substantially transverse to the mounting board 10 for this specification. An FPC board 21 is connected to the vertical electrical connecter 20 as the electrical board. In this embodiment, the FPC board 21 extends substantially parallel to a front flat surface portion 2b of the cartridge chamber 2 of the main body 1.

With this structure, as with the first embodiment, the mounting space for the assembly of the electrical connecter 20 can be kept to a bare minimum, the exclusive region for mounting can be kept to a bare minimum, and, as a result, the size of the camera as a whole may be decreased.

Figure 5:
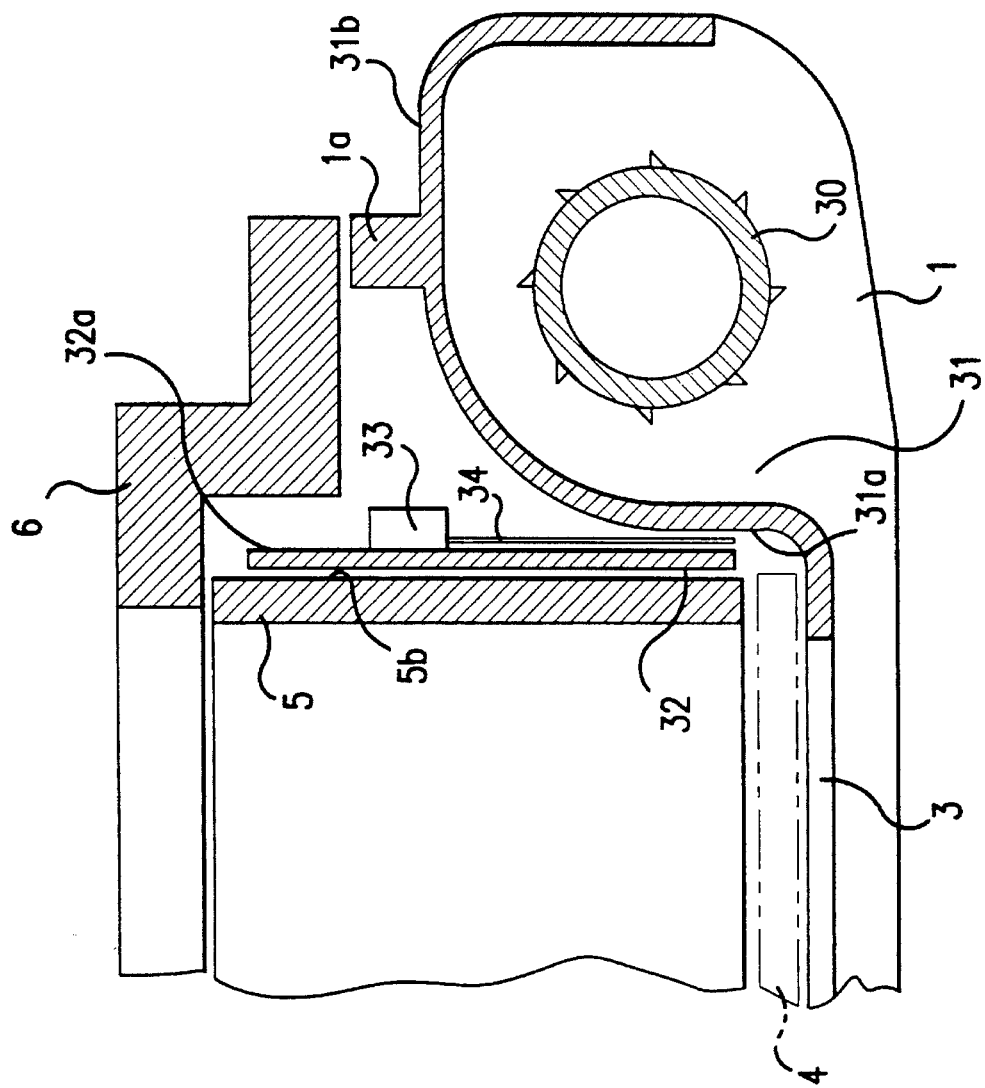
FIG. 5 is a partially enlarged cross section of the spool chamber side of the camera that shows a third embodiment of the basic camera of the invention.
Figure 6:
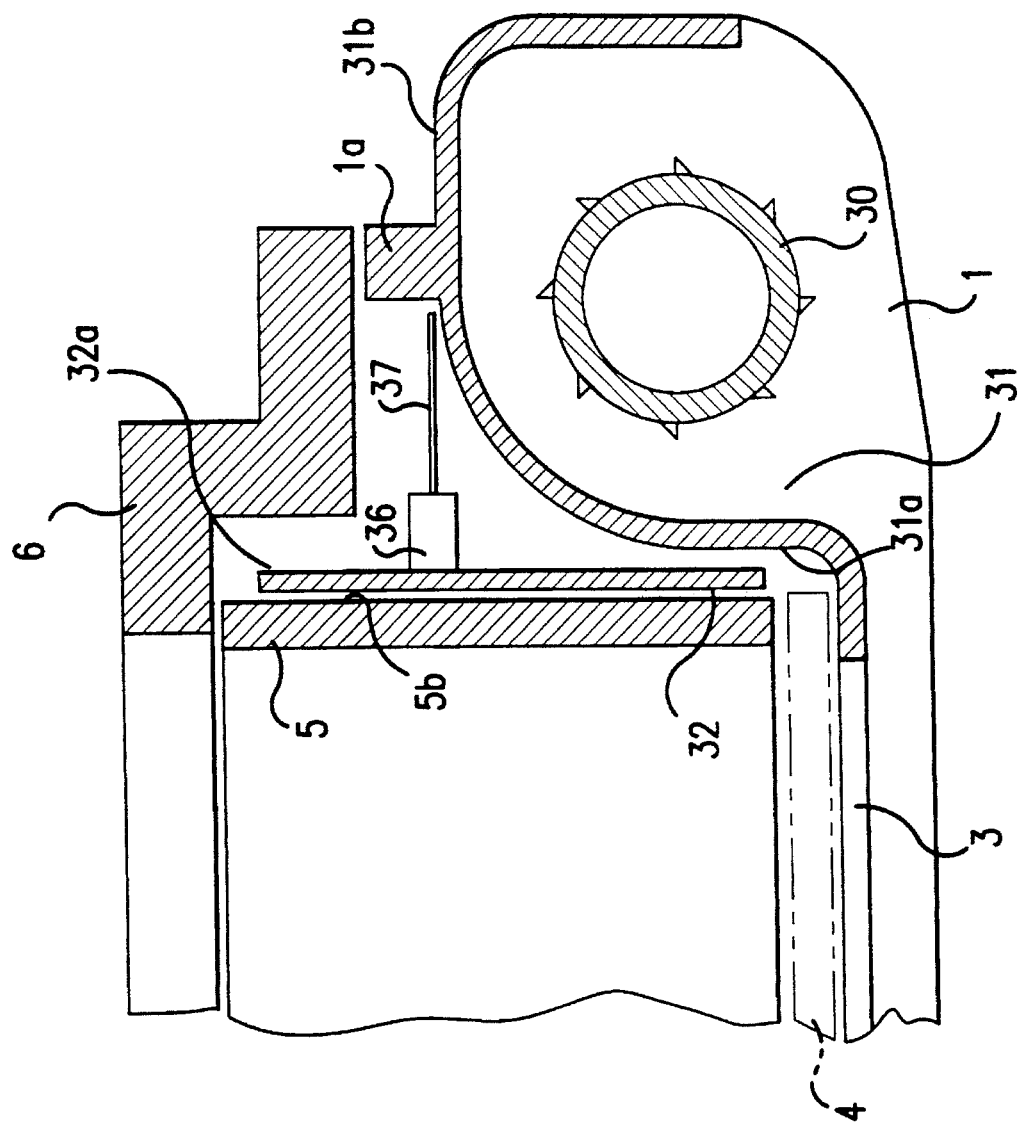
FIG. 6 is a partially enlarged cross section of the spool chamber side of the camera that shows a fourth embodiment of the basic camera of the invention.

FIGS. 5 and 6 show third and fourth embodiments of the invention respectively. In these drawings, components which are the same as or correspond to FIGS. 1–4 or FIG. 11 have the same reference numbers and detailed descriptions are omitted.

In the third and fourth embodiments shown in FIGS. 5 and 6, respectively, a mounting board 32 is positioned in the space between a side flat surface portion 31a of the outer wall of the spool chamber 31, containing a film winding spool 30, and the flat outer wall 5b of the other side of the shrouding component 5. The invention in these embodiments applies to the horizontal or vertical electrical connecters 33 or 36 which is mounted to the mounting board 32 and an FPC board 34 or 37 which is connected to the electrical connecter 33 or 36, respectively. A front flat surface portion 31b comprises a front outer wall of the spool chamber 31.

In FIG. 5, the mounting board 32 is positioned parallel to and in the space between the flat outer wall 5b of the shrouding component 5 and the side flat surface portion 31a on the outer wall of the spool chamber 31. In addition, a horizontal electrical connecter 33 is mounted to the extension section 32a of the mounting board 32, which extends to a position that does not face the side flat surface portion 31a on the outer wall of this spool chamber 31. In this embodiment, the FPC board 34, which is the electrical board, is connected to the horizontal electrical connecter 33. The FPC board 34 is positioned alongside the mounting board 32.

With this structure, as with the previously described embodiments, the mounting space between the flat outer wall 5b of the shrouding component 5 and the side flat surface portion 31a on the outer wall of the spool chamber 31 can be kept to a bare minimum, and efficient mounting is possible by establishing the above-mentioned mounting space of the electrical connector 33 in the clear or open portion of the camera.

In FIG. 6, as with the embodiment of FIGS. 3 and 4 described above, a vertical electrical connecter 36 is mounted onto the extension section 32a of the mounting board 32. An FPC board 37, which is the electrical board, extends from the connector 36 substantially parrallel to the front flat surface portion 31b of the spool chamber 31 outer wall on the front surface side of the body 1. The result is the reduced space required.

Figure 7:
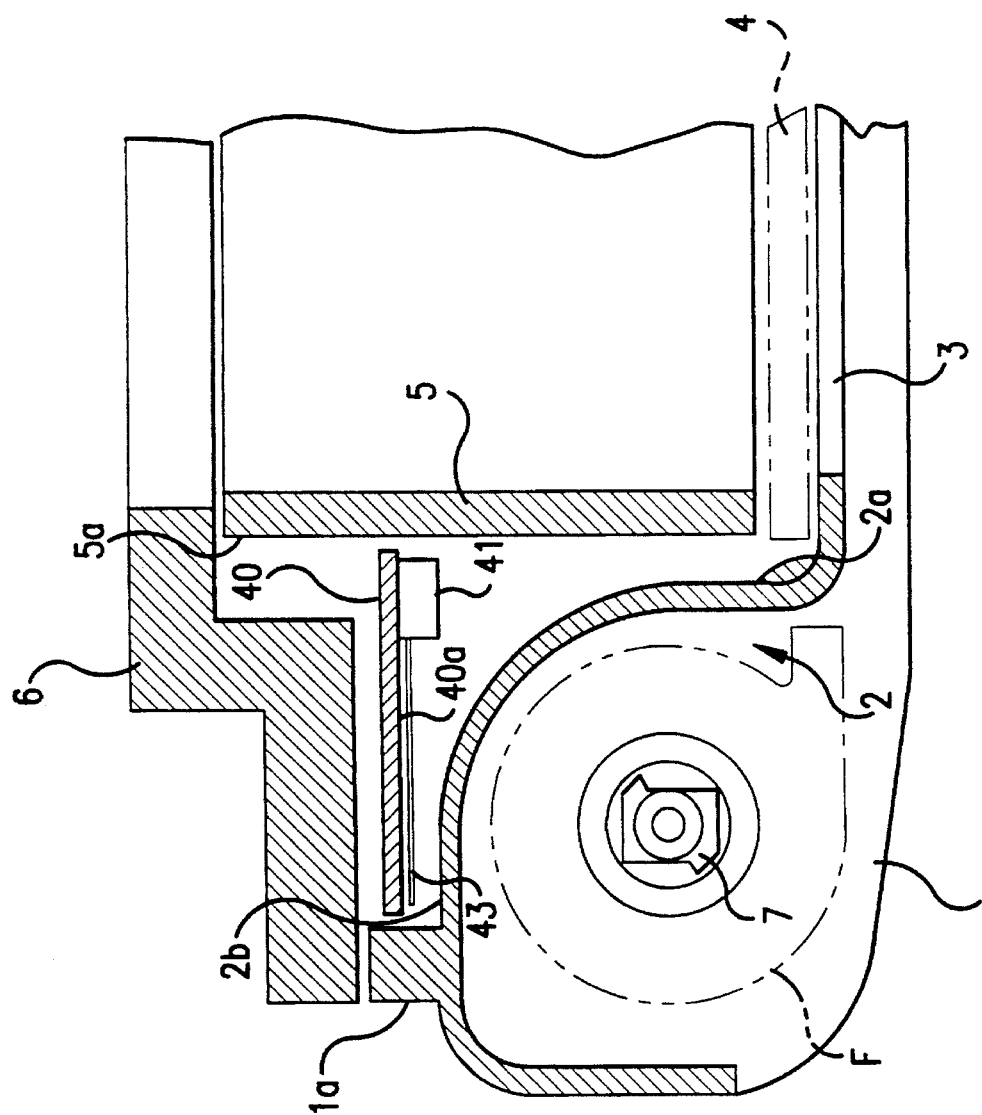
FIG. 7 is a partially enlarged cross section of the cartridge chamber side of the camera that shows a fifth embodiment of the basic camera of the invention.
Figure 8:
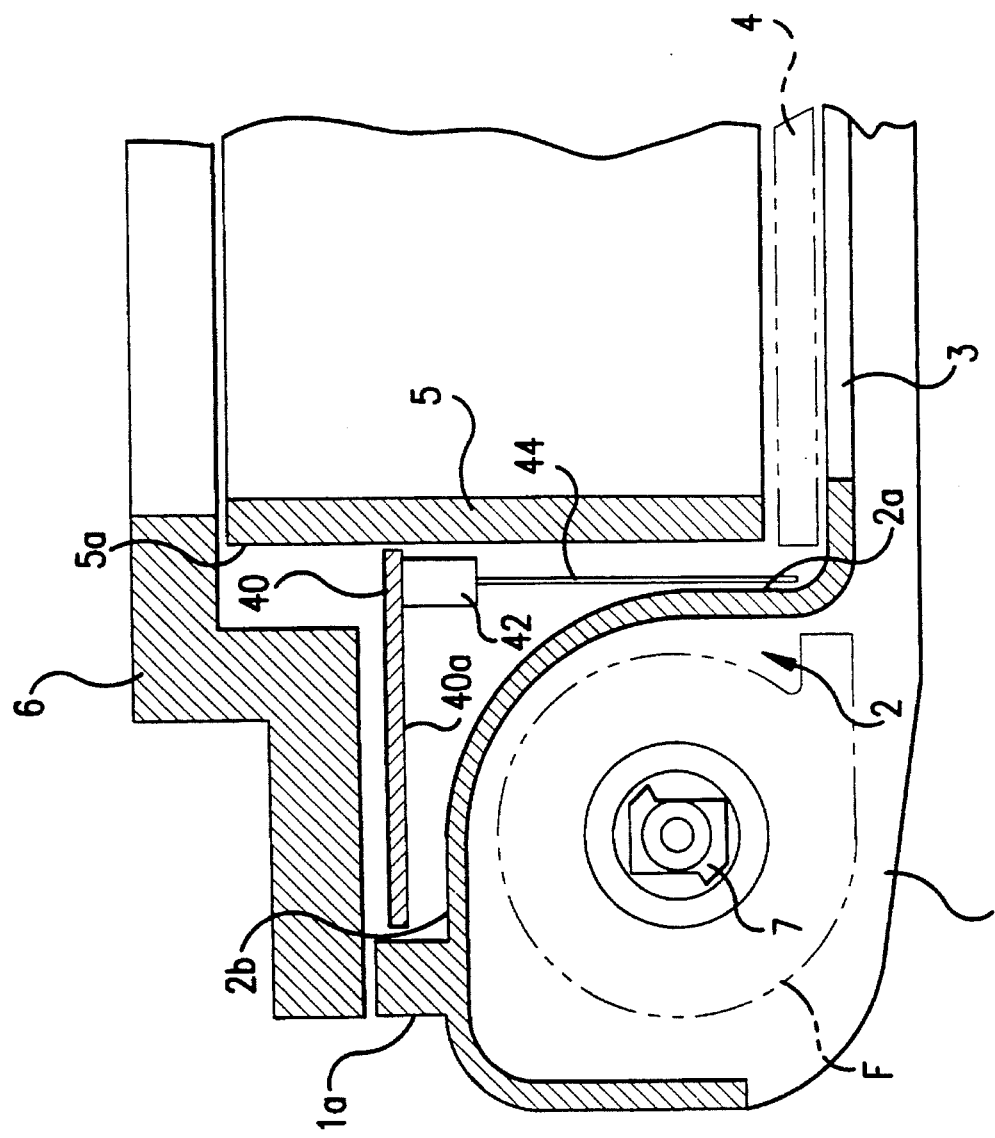
FIG. 8 is a partially enlarged cross section of the cartridge chamber side of the camera that shows a sixth embodiment of the basic camera of the invention.

FIGS. 7 and 8 show fifth and sixth embodiments, respectively, of the camera of the invention. In these figures, components that are the same as or correspond to those of previous embodiments have the same reference number attached and detailed descriptions are omitted.

In these figures, the differences from the previously described embodiments are that the mounting board 40 is positioned parallel to the front flat surface portion 2b on the outer wall of the cartridge chamber 2, a horizontal electrical connecter 41 (see FIG. 7) or a vertical electrical connecter 42 (see FIG. 8) is mounted on the extension section 40a of the mounting board 40, which does not face the flat portion 2b, and an FPC board 43 or 44, which is the electrical board, is connected to the connecter 41 or 42, respectively. In FIG. 7, the FPC board 43 is positioned substantially parallel to the board surface of the mounting board 40, but in FIG. 8 the FPC board 44 is positioned to extend in a direction transverse to the mounting board 40.

Figure 9:
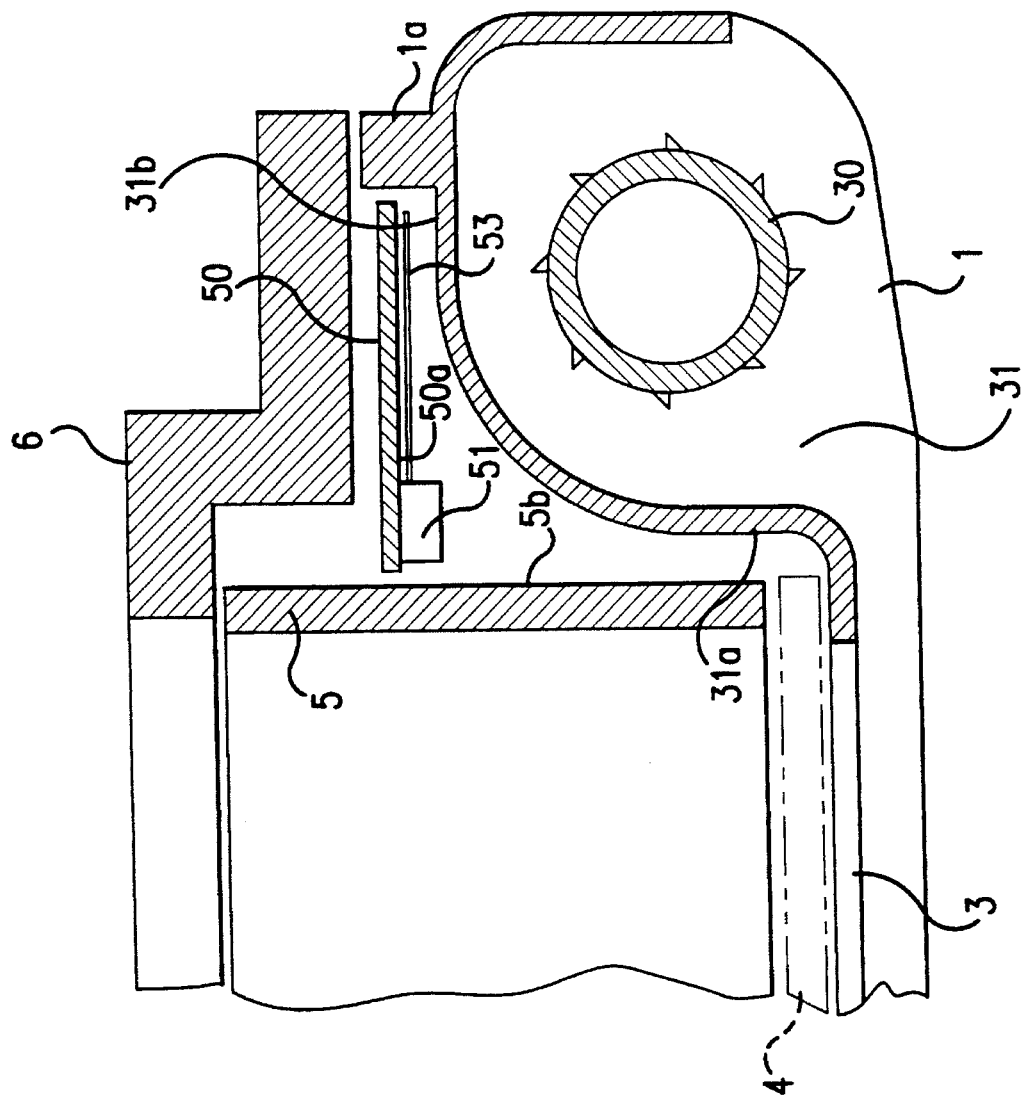
FIG. 9 is a partially enlarged cross section of the spool chamber side of the camera that shows a seventh embodiment of the basic camera of the invention.
Figure 10:
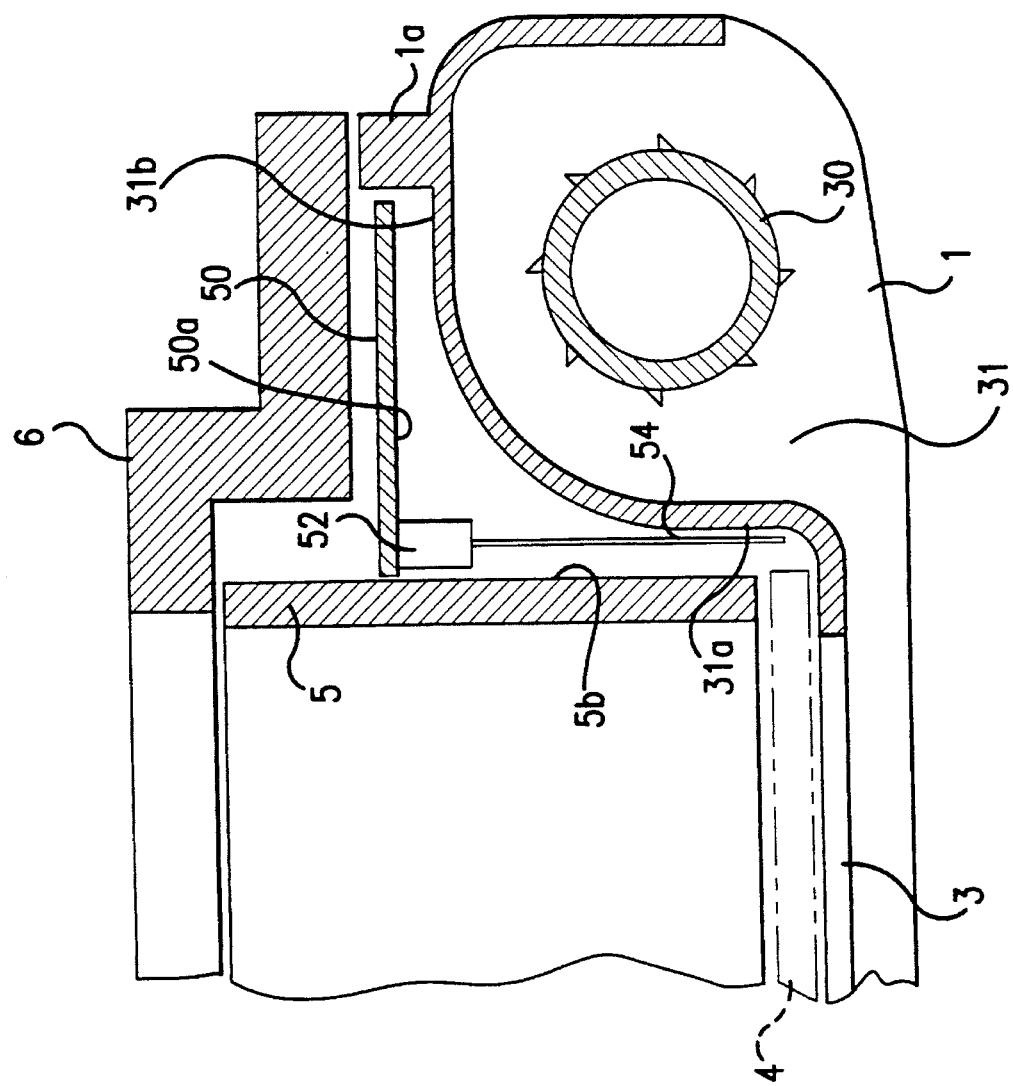
FIG. 10 is a partially enlarged cross section of the spool chamber side of the camera that shows an eighth embodiment of the basic camera of the invention.

FIGS. 9 and 10 show seventh and eighth embodiments, respectively, of the basic camera relating to the invention. In these figures, components that are the same as or correspond to those of the previous embodiments have the same reference numbers attached and detailed descriptions are omitted.

In FIGS. 9 and 10, the differences from the previously described embodiments are the mounting board 50 is parallel to the front flat surface portion 31b of the outer wall of the spool chamber 31, a horizontal electrical connecter 51 (see FIG. 9) or a vertical electrical connecter 52 (FIG. 10) is mounted on the extension section 50a of the mounting board 50, which does not face the flat portion 31b, and an FPC board 53 or 54, which is the electrical board, is connected to the connecter 51 or 52, respectively. In FIG. 9, the FPC board 53 is positioned substantially parallel to the board surface of the mounting board 50, but in FIG. 10, the FPC board 54 is positioned so as to extend in a substantially transverse direction from the mounting board 50.

In each of the embodiments shown in FIGS. 5–10, described above, as with the embodiments of FIGS. 1–4, the mounting space between the components facing the side or front flat surface portions 2a, 2b, 31a, 31b on the outer wall of the film chamber (cartridge chamber 2, spool chamber 31, or the like) can be kept to a bare minimum. The structure in which the above-mentioned mounting board 40 or 50 is positioned parallel to the front flat surface portion on the outer wall of the film chamber in the main body 1 also has the advantage of being able to keep the space between the camera cover (not shown) or the like positioned on the front side of the front body 6 or the main body 1 and the flat portion to a bare minimum.

The basic camera of the invention is not limited to the structure of the embodiments described above. It is obvious that the shape, structure, or the like of the various camera components may be altered as is suitable, and various examples of alteration are conceivable. For example, in the embodiments described, the mounting boards 10, 32, 40, 50 were positioned approximately parallel to the side or front flat surface portions (2a, 2b, 31a, 31b) on the outer walls of the film chambers (2, 31), and horizontal or vertical electrical connecters 11, 20, 33, 36, 41, 42, 51, 52 were mounted to extension sections 10b, 32a, 40a, 50a and do not face the front flat surface portions (2a, 2b, 31a, 31b). However, the same results may be obtained with similar structures.

Further, the invention is not limited to FPC boards 10, 32, 40, 50 as the electrical boards. Various connecting means, such as lead lines or the like, may be used with suitable results.

As described above, according to the basic cameras relating to the invention, since the basic cameras comprise a main body with a flat surface on one portion of the outer wall that forms the film chamber, which is a cartridge chamber or spool chamber, a mounting board with a portion that is adjacent to the flat surface and faces the flat surface on the main body in a substantially parallel relationship and an extension section that does not face the flat surface, an electrical connecter which is on the side opposite the main body on the mounting board and which is attached to the extension section, and an electrical board that is connected to the electrical connecter, the structure produces various superior results, which are listed below, notwithstanding the simplicity and low price of the camera.

According to the basic camera of the invention, either a side flat portion of the main body that borders the photo lens side or a flat portion on the front surface of the main body is used as the flat portion that forms part of the outer wall of the film chamber and is arranged alongside the mounting board. Either a horizontal or vertical electrical connecter is used, and a flexible print board that carries out the electrical connection with the electrical components within the camera is used as the electrical board.

Through this structure, the installing position and structure of the electrical connecter positioned inside the camera and the assembly and structure of the mounting board onto which the electrical connecter is mounted are carefully considered. The exclusive mounting region is constructed compactly, the mounting efficiency is improved, and a size increase of the camera can be prevented resulting in a smaller, more compact, and user-friendly camera.

Figure 12:
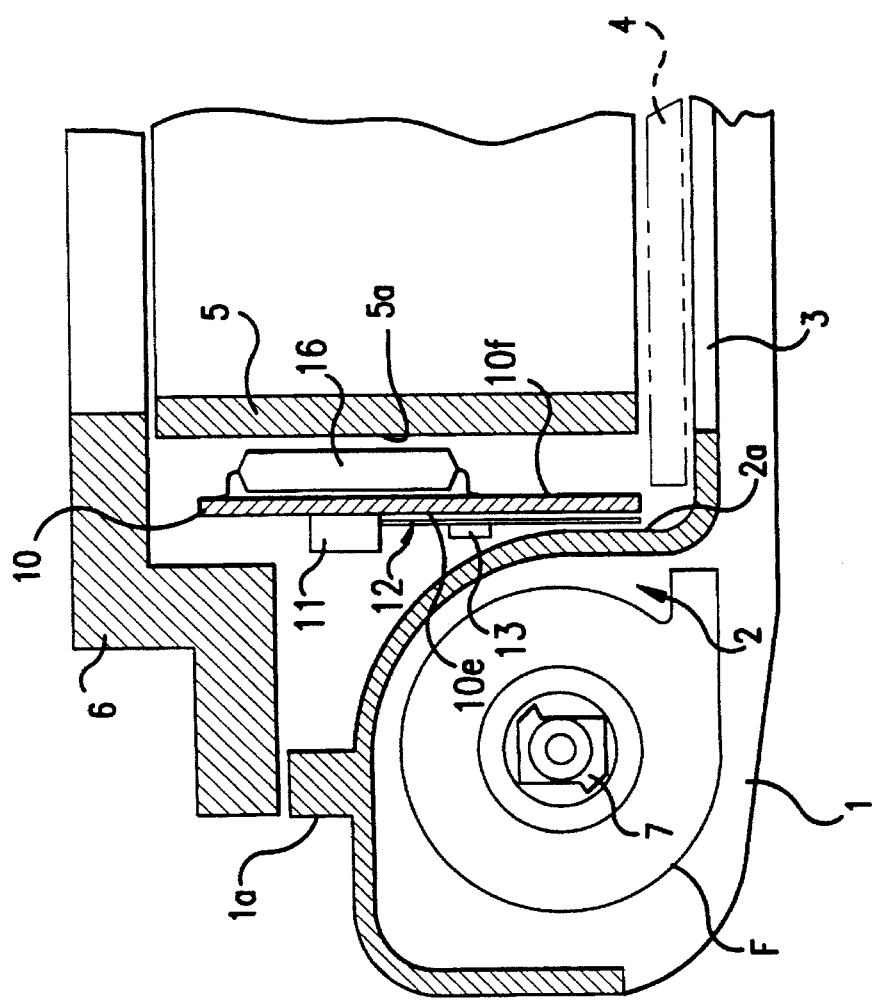
FIG. 12 is an enlarged horizontal cross-section of the parts of a cartridge chamber side of an enhanced feature camera.

Building on the concept described with respect to the basic camera of the invention, the structure of an elementary advanced feature camera is shown in FIG. 12.

With the mounting structure of the enhanced feature camera, when a two-sided mounting board 10 with a relatively thick electrical component (first electrical component 16) mounted on one side, and with an electrical connector 11, to connect the FPC board 12, provided on the opposite side, is laid out in the space having limited width formed by the outer wall 5a of the shrouding component 5 and the flat side section 2a of the outer wall of the cartridge chamber 2, it is necessary to widen the space to avoid interference between the outer wall 5a of the shrouding component 5 and the second mounting surface 10f on which the first electrical component 16 with a relatively large thickness is mounted.

Further, with the two-sided mounting board 10 described above, it is necessary to secure sufficient space to guarantee placement of the FPC board 12 along the first mounting surface 10e on which the electrical connector 11 is mounted.

To do so, the two-sided mounting board 10 is placed, taking the conditions described above into consideration, in the space between the outer wall 5a of the shrouding component 5 and the flat side section 2a of the outer wall of the cartridge chamber 2 (hereinafter called the direction of thickness). However, to obtain additional space for electrical components providing further enhanced features, without unduly increasing the size of the camera, it is necessary to make use of existing space in the camera by a higher density loading of the mounting board 10 and the FPC board 12.

Figure 13:
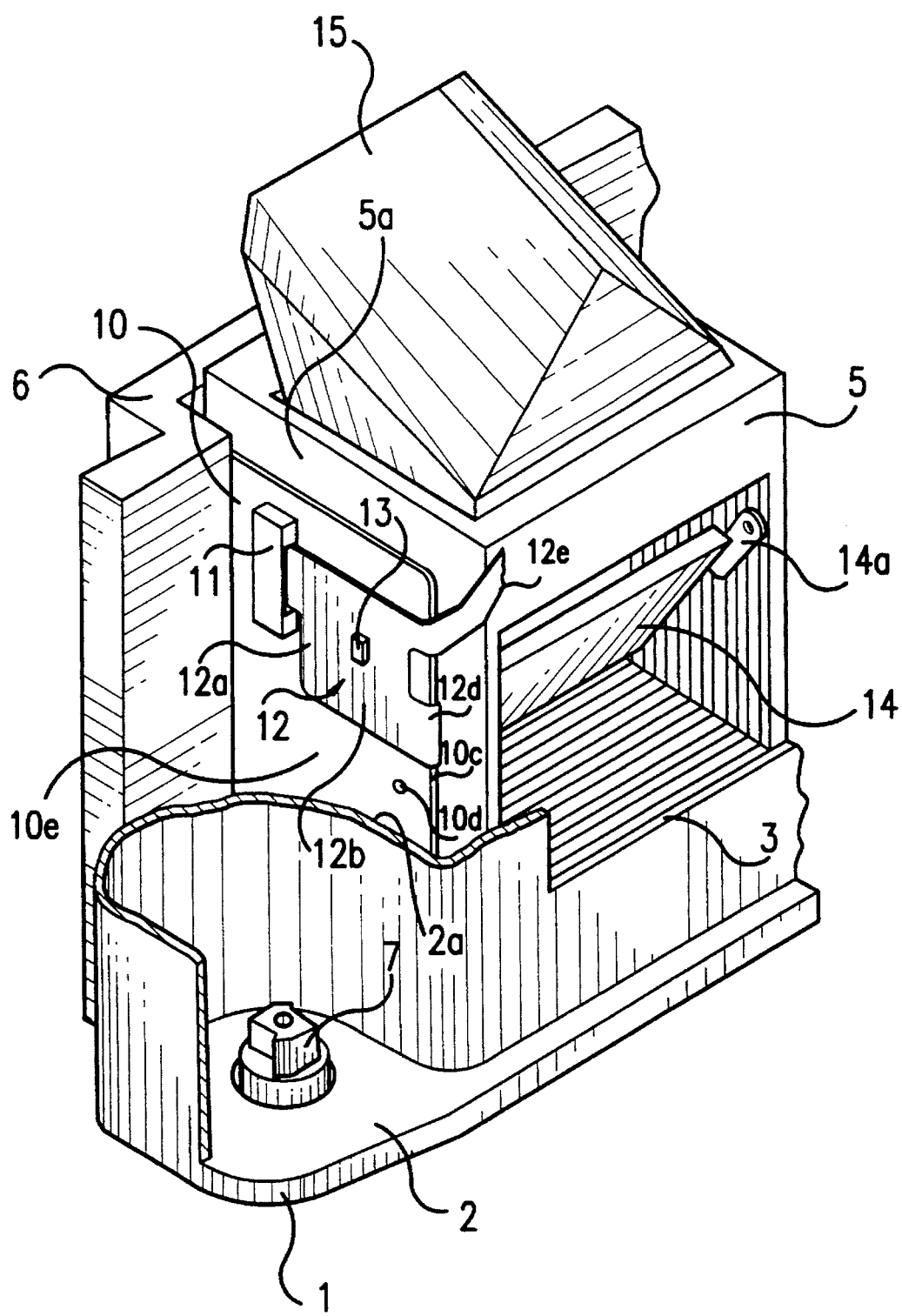
FIG. 13 is a schematic oblique, partial cut away view of a first enhanced feature embodiment camera of the invention, generally an enhancement of the first embodiment of FIGS. 1 and 2, showing part of the side section inside the camera.
Figure 14:
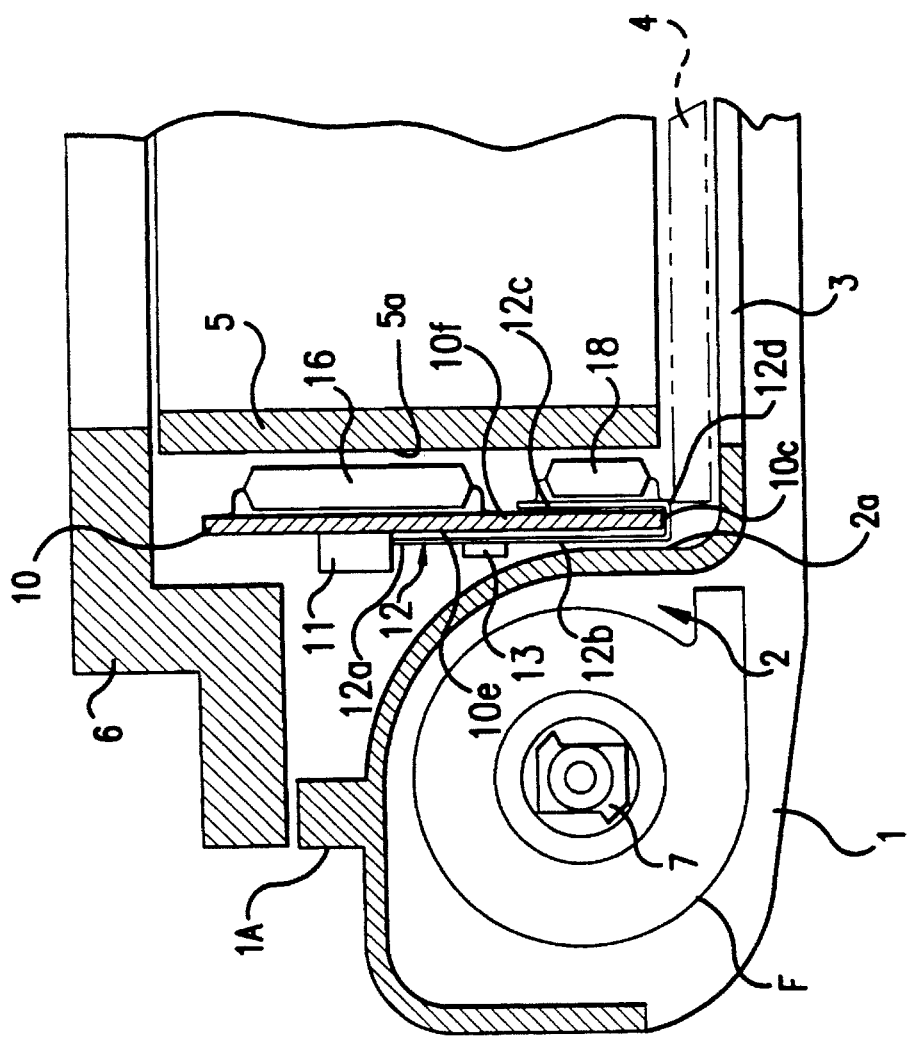
FIG. 14 is an enlarged horizontal cross-section of parts of one side of the first enhanced feature embodiment camera of the invention.
Figure 15:
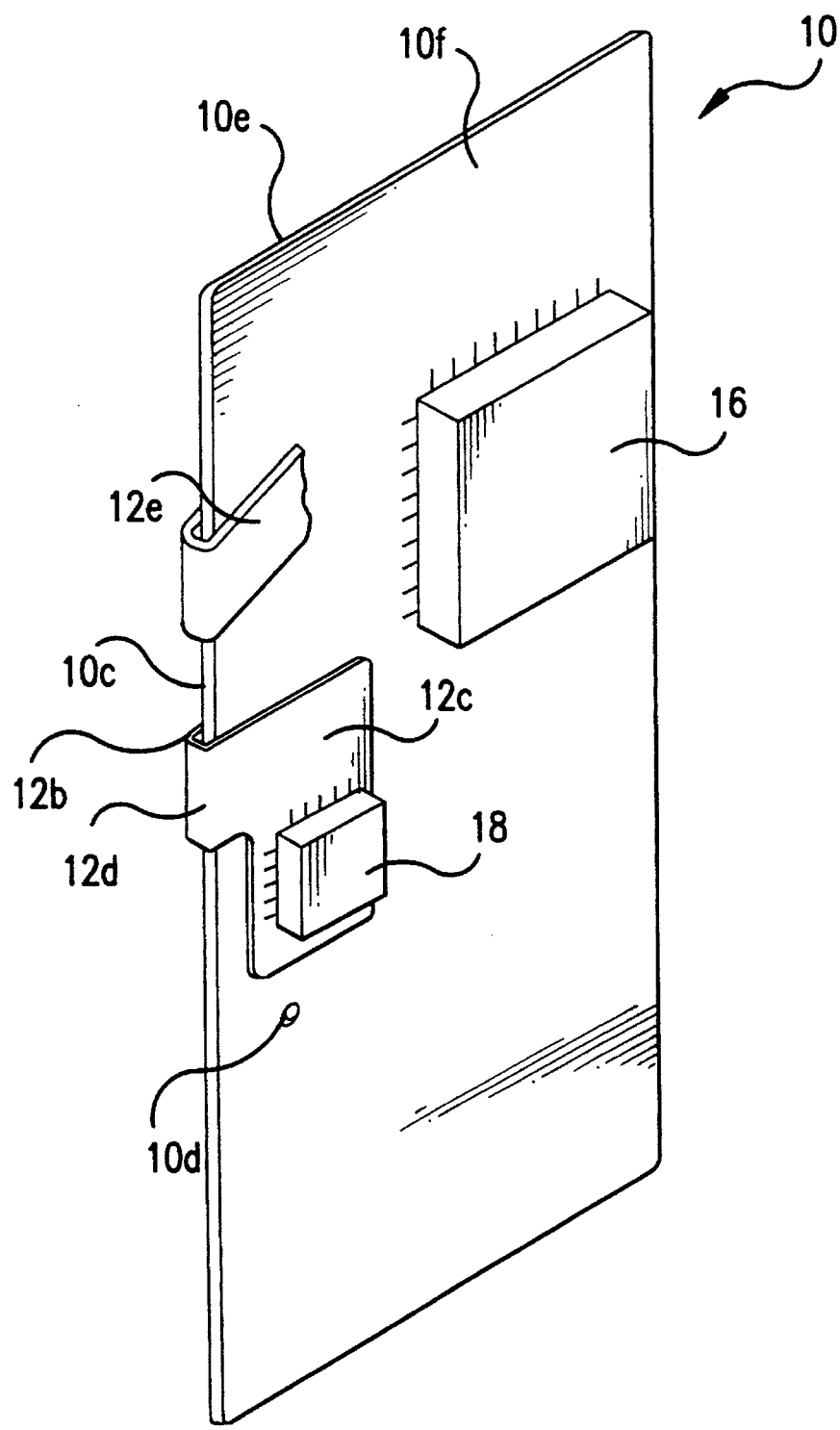
FIG. 15 is a schematic oblique view showing the relationship between a two-sided mounting board and a FPC board.

FIGS. 13 through 15 portray a first enhanced feature embodiment of the invention. In the figures, components identical or equivalent to those described earlier with respect to FIG. 12 are identified with the same reference numbers; hence, a detailed explanation of such components is omitted.

As shown in FIG. 13, a quick return mirror 14 is provided inside the shrouding component 5, which, as is commonly known, guides light to the finder optical system. The quick return mirror 14 operates in such a manner as to retreat from the light path to the film during shooting and to return to the original position after shooting. A revolving bearing unit 14a of the quick return mirror 14 is supported on an axis by the shrouding component 5 to permit the rotation of the quick return mirror 14. A pentagonal prism 15 comprises a finder optical system and is a well known optical component.

According to the enhanced feature camera of the invention, a two-sided mounting board 10 is placed in a space with the necessary width formed between the shrouding component 5, which is a first camera structural member having a nearly flat outer wall 5a, and a cartridge chamber 2 or a film chamber, which is a second camera structural member created by an outer wall having a flat side section 2a which is substantially parallel to the outer wall 5a of the shrouding component 5. The two-sided mounting board 10 has a first mounting surface 10e facing and substantially parallel to the flat side section 2a of the outer wall of the cartridge chamber 2. The mounting board 10 has first section of the first mounting surface 10e which is adjacent to and facing the flat side section 2a, and a second section which extends beyond the flat side section 2a. Moreover, the first mounting surface 10e and a second mounting surface 10f are on opposite sides of the mounting board 10. A first electrical component 16 with a certain thickness, such as IC, is loaded on the second mounting surface 10f.

A horizontal electrical connector 11 is mounted in the second section of the first mounting surface 10e of the mounting board 10. The FPC board 12 is connected to the horizontal electrical connector 11 through a connection terminal 12a, and the surface 12b of the FPC board runs substantially parallel to the first mounting surface 10e.

Moreover, in the invention, the FPC board 12 extends to the opposite side, or second mounting surface 10f of the mounting board 10 by having an extended section 12c running substantially parallel to second mounting surface 10f. The extended section 12c is loaded with a second electrical component 18 with a certain thickness.

Thus, the FPC board 12 has a surface section 12b extended along the first mounting surface 10e within a space between the flat side section 2a of the outer wall of the cartridge chamber 2 and the first mounting surface 10e of the mounting board 10, an extension section 12e for connection to an electrical circuit (not shown) along an edge section 10c of the mounting board 10, and a bending section 12d which is bent around edge section 10c in addition to extended section 12c. The bending section 12d directs the extended section 12c along the second mounting surface 10f of the mounting board 10.

As stated above, a second electrical component 18 thin enough to be placed in the space between the outer wall 5a of the shrouding component 5 and the mounting board 10, is loaded on the extended section 12c, which is continuously formed through the bending section 12d as part the FPC board 12 and which extends along the second mounting surface 10f of the mounting board 10. A third electrical component 13, thin enough for the space between the surface section 12b of the FPC board 12 and the flat side section 2a of the outer wall of the cartridge chamber 2 is loaded on the surface section 12b.

Shown in FIGS. 13 and 15 is an opening 10d provided in the mounting board 10. The opening 10d is used to anchor the mounting board 10 to the outer wall of the shrouding component 5 using an anchoring means (not shown) such as an anchoring screw. In such a structure, when the two-sided mounting board 10, with an electrical connector 11 loaded on the first mounting surface 10e in an electrically connected condition and with a first electrical component 16 with a certain thickness loaded on the second mounting surface 10f, is laid out and placed within the space having a limited width formed by the flat side section 2a in the outer wall of the cartridge chamber 2 and the outer wall 5a of the dark box member, a space is secured in the direction of thickness toward the side of the second mounting surface 10f, which is the mounting side of the first electrical component 16.

The reasons for securing enough space in the direction of thickness toward the second mounting surface 10f are to ease the restriction on the thickness dimension of the electrical component which becomes mountable, and to eliminate problems in the space in the thickness direction if the surface section 12b of the FPC board 12 connected to the electrical connector 11 is placed along the first mounting surface 10e.

The technological reasons for not requiring the mounting board 10 to use the same surface for loading the first electrical component 16 and loading the horizontal electrical connector 11 are that the FPC board 12, to be connected to the horizontal electrical connector 11, may cause interference in the first electrical component 16 if it is placed along the horizontal direction of the mounting board 10, that the electrical connector 11 and the electrical component 16 need to be placed further apart to begin with for convenience of formation of a wiring pattern on the FPC board 12 and, that, in order to realize high density mounting, it is desirable to spread and place electrical components on both sides of the board.

In the invention, only relatively thin electrical components, such as the third electrical component 13, can be loaded on the surface section 12b of the FPC board 12. However, the bending section 12d which is bent around the edge section 10c of the mounting board 10 and the extended section 12c stretched along the second mounting surface 10f between the outer wall 5a of the shrouding component 5 and the second mounting surface 10f of the mounting board 10 enable loading of the second electric component 18 on the extended section 12c. Moreover, the structure of the invention allows the loading of electrical components with thicknesses exceeding the limit for loading on the surface 12b of the FPC board 12 on the side of the first mounting surface 10e to be loaded on the second mounting surface 10f, e.g., the second electrical component 18 on the extended section 12c of the FPC board 12 provided along the side of the second mounting surface 10f.

Stated more precisely, it becomes possible to load on the extended section 12c the second electrical component 18 with a width greater than the space, in the direction of thickness, between the surface section 12b of the FPC board 12 and the flat side section 2a of the outer wall of the cartridge chamber or the space, in the direction of thickness, between the surface section 12b of the FPC board 12 and the first mounting surface 10e of the mounting board 10.

Thus, the invention enables the mounting, without overly restricting their thickness, of electric components on the FPC board 12 which is provided inside a camera, resulting in improved mounting efficiency on the mounting board 10 and the FPC board 12. Such improved efficiency of mounting brings about superior benefits by enabling high density mounting, which leads to a reduction of camera size, and enhancement of the camera's capabilities through increasing the size of the electric circuitry.

Figure 16:
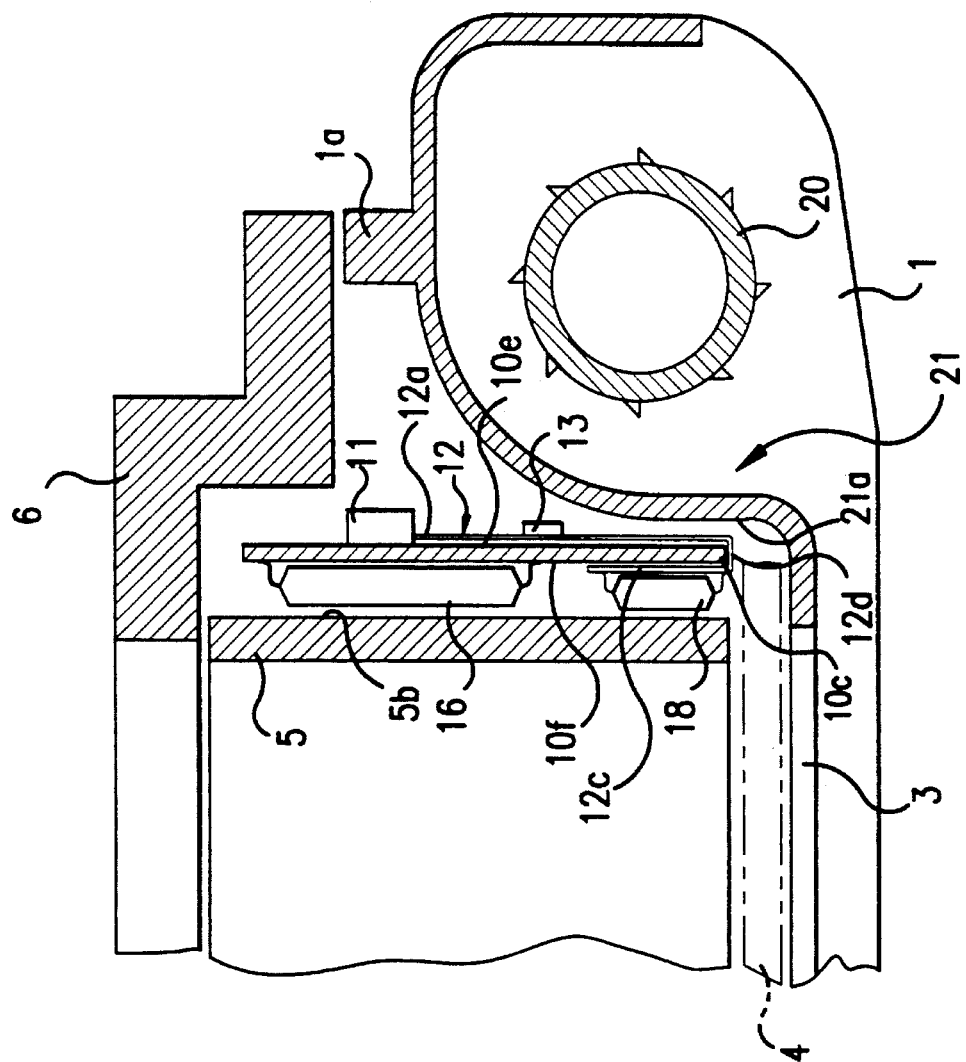
FIG. 16 is an enlarged horizontal cross-section of parts of a second side of a camera in a second enhanced feature embodiment camera of the invention which is generally an enhancement of the third embodiment of FIG. 5.

FIG. 16 presents a second enhanced feature embodiment of the invention. In the figure, components equivalent to the components described in FIGS. 1–3 and FIG. 5 are identified with the same reference numbers and a detailed explanation is omitted. In this second enhanced feature embodiment, a mounting board 10 is placed between the side of a flat section 21a in the outer wall of a spool chamber 21, which is a film chamber having a film winding spool 20, and the other flat outer wall 5b, which is a structural member, of the shrouding component 5. The invention is applied to a horizontal electrical connector 11 which is mounted on the mounting board 10 and the FPC board 12 mounted to the connector 11.

It is easily understood that, even in such a structure, mounting of the mounting board 10 and the FPC board 12 is realized, as in the case of the first enhanced feature embodiment, by using the space with the minimum width necessary between the flat outer wall 5b and the flat side section 21a of the wall of the spool chamber 21, by providing a horizontal electrical connector 11, and by the FPC board 12 having an extended section 12c connected to the electrical connector 11 after bending around edge section 10c of the mounting board 10.

The invention of the enhanced feature embodiments is not limited to the structures above, but can obviously be altered and changed, if necessary, to fit the shape and structure of each component of a camera. For example, in the enhanced feature embodiments above, structures were described in which spaces formed between the outer wall 5a, 5b of the shrouding component 5 and the flat section 2a, 21a on the outer walls of the cartridge chamber 2 and the spool chamber 21, which are film chambers, are used as spaces to place the mounting board 10 and the FPC board 12. However, the invention is not limited to the embodiments, but is equally effective in a structure where space in the direction of thickness is formed by structural members in the camera in a broader sense such as the body of the camera, the front body of the camera, various structure components, assembled structure components, exterior members, electrical components, and electrical boards.

Moreover, in the enhanced feature embodiments above, a structure was described in which the FPC board 12 is bent around the edge section 10c of the mounting board 10 that is toward the rear of the camera when held in a normal operating position. However, it is obvious that the invention is not limited to the edge section 10c toward the rear edge of the body. It is also obvious that in the enhanced feature embodiments described above, the location for mounting the second electrical component 18 can be anywhere on the front or back surfaces of the extended section 12c in the FPC board.

Further, in the enhance feature embodiments described above, an example was provided of the placement of the mounting board 10 having the FPC board 12 between the outer wall 5a, 5b of the shrouding component 5 and the flat side surface 2a, 21a of the film chamber. However, it is obvious that the surrounding area is not limited to a flat surface, but a curved side surface, inclined surface, or dropped surface can also be used as long as there is space in the thickness direction enabling placement of a two-sided mounting board 10.

The invention of the enhanced feature embodiments enables mounting without unduly restricting the thickness of electric components loaded on an FPC board which is provided inside a camera, resulting in improved mounting efficiency. Such improved efficiency brings about superior benefits by enabling high density mounting, which enables the reduction in camera size and provides enhancement of the capability of the camera through increasing the size of the electric circuitry.

The invention of the enhanced feature embodiments especially improve the mounting efficiency and realize higher density mounting by having a first electrical component with a certain thickness loaded on the mounting board on the opposite side of the connector loading side and by having a relatively thick second electrical component loaded on the extension section of the FPC board running along the same surface to which the first electrical component is mounted. Moreover, the invention of the enhanced feature embodiments can further enhance the advantages described above by having relatively thin electrical components loaded on the board surface of the FPC board running along the connector loading surface of the mounting board.

What is claimed is:

1. An electrical components mounting assembly for a camera having a body comprising a front containing a lens, a back, a first side, a second side, a top, a bottom, and an internal structural member extending from the front to the back, comprising:

a mounting board mounted in the camera body substantially parallel to a one of the front of the camera and a side of the internal structural member;

an electrical connector mounted to a first side of said mounting board; and a FPC board electrically connected to said electrical connector, wherein the camera has a further structural member opposing the one of the front of the camera and the side of the internal structural member and offset by a first thickness space and the further structural member further opposes the other of the front of the camera and the side of the internal structural member and is offset by a second thickness space, said mounting board having a section opposing the further structural member and an extension section that does not oppose the further structural member and said electrical connector is mounted to said mounting board in said extension section.

2. The mounting assembly according to claim 1, wherein said electrical connector has an opening substantially parallel to said mounting board.

3. The mounting assembly according to claim 1, wherein said electrical connector has an opening transverse to a plane of the mounting board.

4. The mounting assembly according to claim 2, wherein said FPC board is mounted in the opening of said electrical connector to make the electrical connection, said FPC board extending substantially parallel to said mounting board.

5. The mounting assembly according to claim 4, wherein said mounting board and said FPC board extend into the first thickness space which is between the internal structural member and the further structural member.

6. The mounting assembly according to claim 1, wherein the further structural member is a film cartridge chamber.

7. The mounting assembly according to claim 1, wherein the further structural member is a film take-up chamber.

8. The mounting assembly according to claim 5, wherein said mounting board and said FPC board extend into the second thickness space which is between the camera front and the further structural member.

9. The mounting assembly according to claim 4, wherein said FPC board is mounted in the opening of said electrical connector to make the electrical connection, said FPC board extending substantially transverse of the plane of said mounting board.

10. The mounting assembly according to claim 9, wherein said mounting board extends into a one of the first and second thickness spaces and said FPC board extends into the other of the first and second thickness spaces.

11. The mounting assembly according to claim 4, further comprising a first electrical component mounted on a second side of said mounting board.

12. The mounting assembly according to claim 11, further comprising a second electrical component mounted to said FPC board.

13. The mounting assembly according to claim 11, wherein said FPC board bends around an edge of said mounting board and has an extended section along the second side of said mounting board.

14. The mounting assembly according to claim 13, further comprising a second electrical component mounted to said extended section of said FPC board.

15. The mounting assembly according to claim 14, further comprising a third electrical component mounted to said FPC board.

16. The mounting assembly according to claim 14, wherein said mounting board and said FPC board extend into the first thickness space.

17. A camera, comprising:

a main body with a flat surface on one portion of an outer wall that forms a film chamber;

a mounting board with a portion that is adjacent to said flat surface and faces said flat surface of the film chamber in a substantially parallel relationship and an extension section that does not face said flat surface;

an electrical connector which is mounted to said extension section; and an electrical board that is connected to said electrical connector, wherein the flat surface that forms part of the outer wall of the film chamber opposes either a side flat portion of the main body that encloses a photo lens to define a first thickness space or an inner front surface of the main body to define a second thickness space.

18. The camera according to claim 17, wherein the electrical connecter is either horizontal or vertical.

19. The camera according to claim 17, wherein the electrical board is a flexible print board that carries out the electrical connection with the electrical components positioned within the camera.

20. A camera, comprising:

a first camera structure member;

a second camera structure member comprising a side wall section facing part of the first camera structure member;

a two-sided mounting board comprising a first section placed in the vicinity of and facing the side wall section of the second camera structure member and a second section extending to the position not directly facing the side wall section;

a horizontal connector for use in electrical connections loaded on the second section of the mounting board;

a first electrical part loaded on the opposite surface from the loading surface of the horizontal connector for use in electrical connections in the mounting board; and a flexible printed circuit board to be connected to the horizontal connector for use in electrical connections and to be placed along the connector loading surface of the mounting board, wherein the flexible printed circuit board is placed extending to the surface opposite from the connector mounting surface around an edge section of the mounting board, and wherein a second electrical part is loaded on the extended opposite surface.

21. The camera according to claim 20, wherein the first camera structural member is the side outer wall of a shrouding component placed within the camera.

22. The camera according to claim 20, wherein the second camera structural member is the outer wall of either a cartridge chamber or a spool chamber.

23. The camera according to claim 20, wherein a relatively thick electrical part is used as the first and second electrical parts.

24. The camera according to claim 23, wherein a relatively thin electrical part is loaded on the board surface of a flexible printed circuit board to be placed along the connector loaded surface of the mounting board.

* * * * *